United States Patent [19]

Reafler

[11] Patent Number: 4,918,800
[45] Date of Patent: Apr. 24, 1990

[54] CONTINUOUS METHOD FOR MAKING DECORATIVE SHEET MATERIALS

[75] Inventor: Gerald G. Reafler, Rochester, N.Y.

[73] Assignee: Eastman Kodak Company, Rochester, N.Y.

[21] Appl. No.: 332,191

[22] Filed: Apr. 3, 1989

[51] Int. Cl.[5] .............................................. B21B 1/24
[52] U.S. Cl. .................................. 29/527.2; 156/183; 427/257; 427/304; 427/305
[58] Field of Search ............... 29/527.2; 156/183, 184; 427/257, 304, 305, 306

[56] References Cited

U.S. PATENT DOCUMENTS

| | | | |
|---|---|---|---|
| 2,001,049 | 5/1935 | Alden | 427/257 X |
| 2,464,143 | 3/1949 | Martinson | 427/304 |
| 2,681,294 | 6/1954 | Beguin | 118/50 X |
| 2,850,999 | 9/1958 | Kaplan et al. | 29/527.2 X |
| 3,082,510 | 3/1963 | Kelley et al. | 427/257 X |
| 4,115,619 | 9/1978 | Kurfman et al. | 428/336 |
| 4,117,181 | 9/1978 | Minami et al. | 427/257 X |
| 4,220,679 | 9/1980 | Backhouse | 427/407.1 X |
| 4,246,381 | 1/1981 | Robeson | 525/444 |
| 4,287,325 | 9/1981 | Jackson, Jr. et al. | 525/444 |
| 4,403,003 | 9/1983 | Backhouse | 427/407.1 |
| 4,582,876 | 4/1986 | Weemes et al. | 525/176 X |
| 4,681,811 | 7/1987 | Simpson et al. | 427/407.1 X |
| 4,726,982 | 2/1988 | Traynor et al. | 428/213 |
| 4,769,100 | 9/1988 | Short et al. | 156/285 |

FOREIGN PATENT DOCUMENTS

| | | | |
|---|---|---|---|
| 25705 | of 1898 | United Kingdom | 427/257 |
| 376040 | 7/1932 | United Kingdom | 156/183 |

Primary Examiner—Carl J. Arbes
Attorney, Agent, or Firm—William J. Davis

[57] ABSTRACT

A continuous method for making a protective and decorative sheet material comprises:
(A) forming a highly reflective, specular metal layer on a continuously moving web of a thermoformable carrier film; and
(B) continuously bending and drawing the web biaxially around first and second non-parallel cracking members to create in the metal layer a pattern of microscopic cracks which, when the sheet material is stretched and thermoformed, is capable of exhibiting a brushed metal appearance.

5 Claims, 4 Drawing Sheets

CONTINUOUS METHOD FOR MAKING DECORATIVE SHEET MATERIALS

FIELD OF THE INVENTION

This invention relates to a continuous method for making a protective and decorative sheet material which is capable, upon being thermoformed onto a substrate, of exhibiting a "brushed metal" appearance.

BACKGROUND OF THE INVENTION

Decorative films are known which comprise a thermoplastic film coated with a metallic layer. For example, Kurfman et al in U.S. Pat. No. 4,115,619, issued Sep. 19, 1978, describe thermoplastic films which have coated thereon a normally solid soft metal such as indium or an alloy of tin and cadmium, and which can be stretched and elongated without losing the initial specular reflectivity of the metal coating. Such materials are useful, for instance, in covering automobile parts, appliances or other substrates. However, for some applications, it is desirable to provide decorative metal surfaces which have a brushed metal appearance, i.e., a relatively non-specular surface, rather than a highly specular surface.

A protective and decorative sheet material which, upon stretching and thermoforming onto a substrate, exhibits a brushed metal appearance is disclosed in Spahn, U.S. Ser. No. 274,214, filed Nov. 21, 1988. The referenced patent application also discloses a non-continuous method for making such sheet material. It would be highly desirable to provide a method for manufacturing such sheet material more efficiently and economically in a continuous manner. The present invention provides such a method.

SUMMARY OF THE INVENTION

In accordance with this invention, a continuous method is provided for making a protective and decorative sheet material which comprises:

(A) forming a highly reflective, specular, metal layer on a continuously moving web of a stretchable, thermoformable, polymeric carrier film; and (B) cracking the metal layer biaxially at a temperature below the glass transition temperature of the carrier film by continuously bending and drawing the web around a first cracking member having a linear cracking edge to create a first series of substantially linear and parallel microscopic cracks in the metal layer, continuously bending and drawing the web around a second cracking member having a linear cracking edge which is non-parallel to the first cracking member edge to create a second series of substantially linear and parallel microscopic cracks in the metal layer, said first series of cracks being non-parallel to the second series and thereby forming in the metal layer a substantially regular, microscopic parallelogram crack pattern, the so cracked metal layer (a) having a 20-degree gloss of at least 100; and (b) being capable, when the sheet material is stretched above the glass transition temperature of the carrier film, of exhibiting a brushed metal appearance having a 20-degree gloss of less than 100.

THE DRAWINGS

This invention is further illustrated in the following detailed description and in drawings in which.

DETAILED DESCRIPTION

Figure 1:
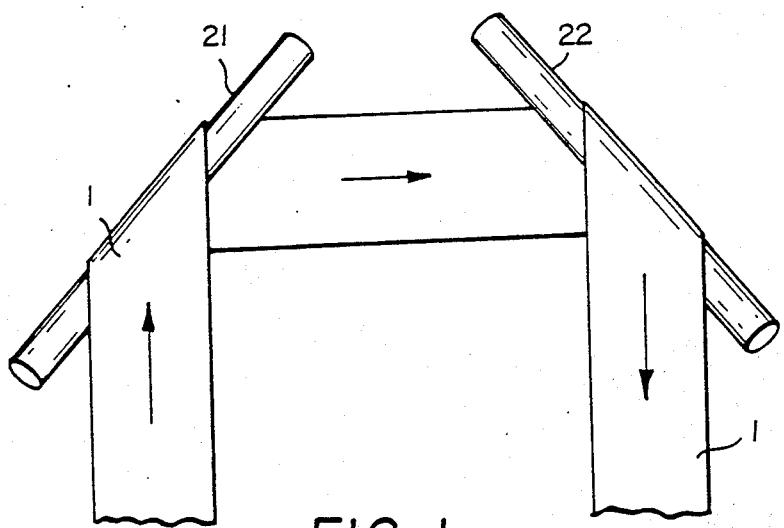
FIG. 1 is a schematic view illustrating an arrangement for continuously creating microscopic cracks in a metal layer deposited on a thermoformable carrier film.

The flexible and stretchable carrier film employed in accordance with this invention comprises an essentially planar, self-supporting, stretchable thermoplastic polymeric film on which a metal layer is formed. Suitable polymeric materials for the flexible and stretchable carrier film include thermoplastic polymers having heat softening and tensile elongation properties which are suitable for thermoforming or vacuum forming processes. The flexible and stretchable carrier film can be transparent, translucent or opaque. The carrier film has a substantially uniform thickness in the range from about 0.16 to 0.32 millimeters (6 to 12 mils). Materials for the carrier film are stretchable thermoplastic polymers having heat softening and tensile elongation properties suitable for use in the thermoforming process. Preferred are polymers known to be useful in thermoforming and/or vacuum-forming techniques, such as polyesters, polyacrylates, polyvinyl chloride, polyvinyl acetate, ABS (acrylonitrile-butadiene-styrene) resins, polyethylene and polypropylene. These include the polyacrylate blends with copolyesters described in U.S. Pat. No. 4,246,381, and the copolyesters derived from aromatic polyesters and glycol polyesters described in U.S. Pat. No. 4,287,325. Blends of rubber-modified styrene-maleic anhydrides with polycarbonates and/or polyesters are also preferred, as are blends of poly(ether-esters) and polyesters. Particularly preferred carrier film materials exhibit a tensile elongation at break of at least about 40 percent when measured in accordance with ASTM D-638. A highly preferred carrier film material is a blend of copolyesters based on poly(1,4-cyclohexylene-dimethylene terephthalate) and rubber-modified styrene-maleic anhydride copolymers as described in U.S. Pat. No. 4,582,876. Other preferred compositions for the carrier film include the blend of poly(ether-esters) and polyesters disclosed in Seymour, U.S. patent application Ser. No. 151,727 filed Feb. 3, 1988. The carrier film can include fillers, UV absorbers, plasticizers, colorants, antioxidants, etc. known to be useful in polymeric films.

A continuous metal layer is applied over the above-described thermoformable carrier film. Alternatively, the metal layer can be deposited on an intermediate layer, such as a paint layer and/or an adhesion promoting layer, disposed on the carrier film. The metal layer can be applied by vacuum deposition, electrolytic or electroless deposition or similar known metallizing techniques.

One preferred method for applying the continuous metal layer to the carrier film is the electroless process described by Lowenheim in "Metal Coatings of Plastics," Noyes Date Corporation, (1970), by Pinter, S. H. et al., "Plastics: Surface and Finish," Daniel Davey & Company, Inc., 172–186 (1971), or in U.S. Pat. No. 2,464,143. An especially preferred metallization technique is a vacuum deposition technique wherein the metal is vacuum evaporated onto the polymer layer as described by William Goldie in "Metallic Coating of Plastics," Vol. 1, Electrochemical Publications Limited, Chap. 12 (1968). Other preferred metallization techniques include the sputter coating procedure described in Chapter 13 of Goldie, supra, and the deposition method disclosed in U.S. Pat. No. 3,197,175. Other suitable metallization techniques include electroplating and ion plating. The vacuum deposition of the metal layer may also be carried out by the techniques described by Maissel & Glang, in the "Handbook of Thin Film Technology," or by Vossen and Kern, in "Thin Film Processes."

For metallizing the carrier film, a continuous web of the carrier film can be coated in a batch web coater or in an air-to-air, in-line vacuum web coater. For highest production rates, an evaporation process is preferred; for some materials and effects, sputtering may be desirable.

Any metal can be employed which is sufficiently brittle that microscopic cracks are formed therein when "pre-cracked" in accordance with the procedure described below. Titanium is the presently preferred metal, although other microscopically crackable metals, such as silver, chromium, nickel, iron and various alloys can also be employed.

The metal layers are generally from 0.02 to 1.0 μm in thickness, and preferably have a thickness of from 0.04 to 0.15 μm.

The surface reflectivity of the metal layers can be quantified by two measurements of different surface characteristics: gloss and geometric metamerism (also called flop).

The total light reflected from the metal surface includes light reflected at a specular angle and the remaining light which is scattered at non-specular angles. The specularly reflected light is a measure of gloss. Rough surfaces and matte surfaces tend to scatter the light and exhibit low gloss. Conventional gloss indices measure the light reflected through a small aperture at the specular angle (e.g., 20 degree) and are calibrated to a standard index. For the purpose of providing a reference, a highly reflective surface exhibits a 20-degree gloss in excess of 100 when measured on a Hunterlab Model D47R-6 Dorigon Glossmeter in accordance with ASTM Test D-2457.

Geometric metamerism (flop) is a term used to describe the degree of metallic appearance of metallic paints. A high flop is a high degree of "metallic appearance". It is characterized by a high level of reflection intensity in the angles adjacent to the specular angle (usually much higher intensities than would be achieved by a non-metal) and a very low intensity at far (flop) angles.

Geometric metamerism can be determined by the method disclosed in Alman U.S. Pat. No. 4,479,718, titled "Three Direction Measurements for Characterization of a Surface Containing Metallic Particles".

Figure 2:
FIG. 2 through 6 show cross-sections of various protective and decorative sheet materials usable in the process of the invention.

In accordance with this invention, a flexible and thermoformable carrier film having a highly reflective, specular, continuous metal layer thereon is subjected to a continuous "pre-cracking" operation. Pre-cracking forms, in the metal layer, a pattern of microscopic cracks. Pre-cracking preferably is conducted by applying tension to the metal layer. Tensile pre-cracking has been found to produce more uniform microscopic cracks than pre-cracking using compressive techniques. One presently preferred form of continuous pre-cracking is shown in FIG. 1 wherein a web of flexible sheet material of the type described herein comprising a carrier film 2 and having deposited thereon a metal layer 3 (as shown in FIG. 2) is continuously drawn and bent under tension biaxially around cracking members 21 and 22. Each member in the embodiment shown in FIG. 1, is a small-diameter rod or mandrel. The web is wrapped approximately 180 degrees around each cracking member to form microscopic cracks in the metallic layer.

Bending around the first cracking member 21 results in the formation of a first series of substantially linear and parallel microscopic cracks at an angle $\alpha$ relative to the initial direction of travel of the web. Then a second series of substantially linear and parallel microscopic cracks at an angle $\beta$ relative to the direction of travel (b) is formed by bending the web continuously around the second cracking member 22, as is illustrated in FIG. 1. A generally rectangular or quadrangular pattern of microscopic cracks is formed when the angles $\alpha$ and $\beta$ are complementary to each other. Other patterns, such as trapezoidal or triangular shaped patterns can be formed when the angular paths of travel of the sheet material are chosen to be non-complimentary with respect to each other. In all instances the metal layer is cracked so as to produce a microscopic parallelogram crack pattern.

Figure 1A:
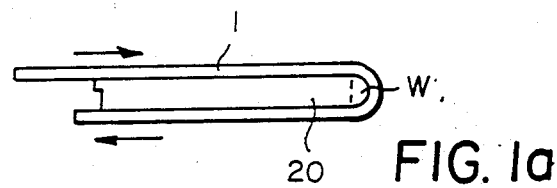
FIG. 1a illustrates an alternative configuration of cracking members for use in the arrangement shown in FIG. 1.

Although cracking members 21 and 22 are depicted in FIG. 1 as cylindrically shaped rods or mandrels, they can have other configurations so long as there is provided a relatively thin linear cracking edge for continuously bending and cracking the metal layer. If desired, the cracking member can have an essentially planar configuration terminating in a linear edge w as cross-sectionally shown in FIG. 1a. The surface of the edge w in FIG. 1a is advantageously made of a material which reduces the friction between the moving web and the cracking member during the bending and cracking operation. To further reduce friction, when using webs of limited width, the linear cracking edge w can be a small-diameter rod or cylinder or a plurality of such rods or cylinders, rotatably mounted in the planar component of the cracking member. Cracking members 21 and 22 are arranged so as to form a first and a second series of linear cracks, each of which series is out of parallel with the direction of web travel and the second series of cracks prescribes an angle relative to the linear orientation of the first series of cracks such that there is created a substantially regular, microscopic parallelogram crack pattern which is capable of exhibiting a brushed metal appearance as defined hereinbefore. Equipment configuration and pattern feasibility are limiting factors in angle selection. More specifically, angles $\alpha$ and $\beta$ can be selected such that each of the first and the second series of cracks is out of parallel by at least about 20° with the direction of web travel, and the second series of cracks prescribes an angle between about 20° and 90°, and preferably between about 45° and 90°, relative to the linear orientation of the first series of cracks.

The cracked metal layer becomes translucent in proportion to the degree of stretching which the sheet material undergoes during the thermoforming operation. The so-created translucency produces desirable visual effects as, for example, the color of an underlying paint layer is diffusely visible after bonding of the sheet material to a substrate.

Figure 9:
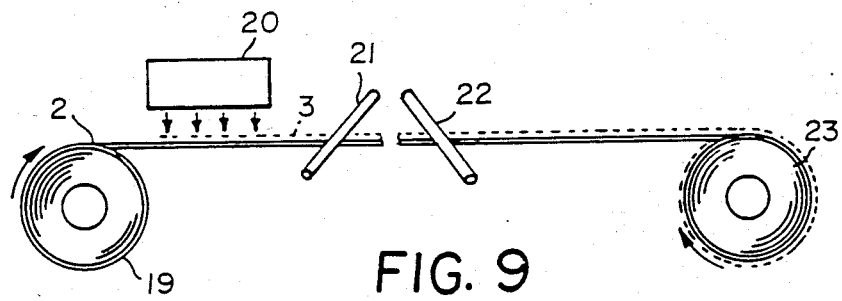
FIG. 9 is a schematic view of an apparatus for continuously making sheet material by the method of this invention.

FIG. 9 is a diagrammatic illustration of one form of apparatus suitable for continuously making a sheet material in accordance with the invention.

In FIG. 9, a web comprising a carrier film 2 as shown, e.g., in FIG. 2 is fed continuously from supply roll 19 opposite metal application means 20 for depositing onto the carrier film a continuous metal layer 3 as shown in FIG. 2. It is then advanced over cracking members 21 and 22 as more clearly illustrated in FIG. 1 to crack the metal biaxially, and finally is wound on take-up roll 23 for storage prior to the thermoforming operation in which the sheet material is bonded to a substrate.

The decorative sheet material in accordance with this invention can comprise several different arrangements. FIG. 2 illustrates a sheet material comprising a flexible and stretchable carrier film 2 having a metal layer 3 thereover.

Figure 3:
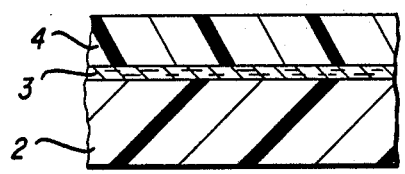

In FIG. 3 there is shown flexible and stretchable carrier film 2 having metal layer 3 thereon and clearcoat 4 thereover.

Figure 4:
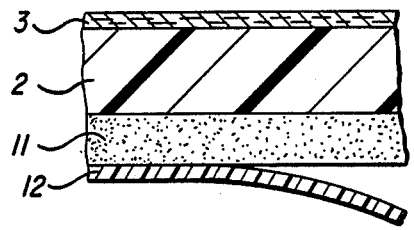

In FIG. 4 a flexible and stretchable carrier film 2 has a metal layer 3 thereon and, on the reverse side, an adhesive layer 11 with a protective sheet 12 releasably adhered to adhesive layer 11.

Figure 5:
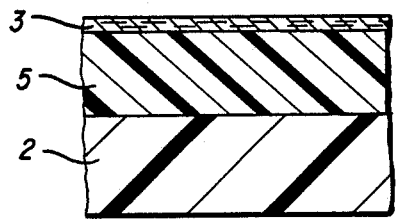

FIG. 5 shows an embodiment in which the metal layer 3 is deposited on a paint layer 5 which has been coated and dried on the carrier film 2.

Figure 6:
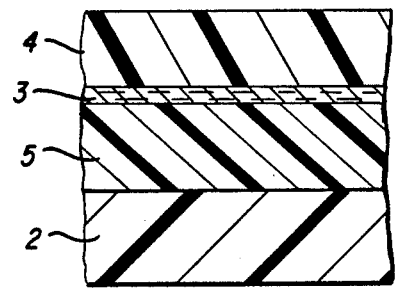

In FIG. 6, the sheet material of FIG. 5 is depicted with clear coat 4 thereon.

Paint layers useful herein preferably comprise a colorant incorporated in a film forming binder. Conventional colorants used in surface coating compositions can be employed, including inorganic pigments such as titanium dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others known to those skilled in the art.

The paint layer can include reflective particles in addition to a colorant and binder. Any particles conventionally employed in paints, particularly those employed in automotive finish paints can be used. Suitable reflective particles include metallic flakes such as aluminum flake, copper flake, bronze flake, copper bronze flake, nickel flake, zinc flake, magnesium flake, silver flake, gold flake, platinum flake and other platelets such as mica, glass, stainless steel, coated mica, coated glass, and aluminum coated polyester film fragments. Mixtures of two or more types of particles can be used.

The film-forming binder can comprise any of the film-forming resins conventionally used as binders in base coat compositions. Particularly useful resinous binders are acrylic polymers, polyesters, including alkyds, and polyurethanes. Examples of such binders and methods for the preparation thereof are described in U.S. Pat. Nos. 4,681,811; 4,403,003 and 4,220,679. A preferred resin binder for the paint layer comprises a polyurethane which can be prepared by reacting polyester polyols or acrylic polyols with a polyisocyanate. The paint composition generally is applied to the support film in a liquid medium.

The paint layer, adhesive layer and clearcoat layer can be applied by forming a laminar flow of the coating composition, and directing the flow into contact with the surface of the support to form the layer, as further described in Reafler patent application U.S. Ser. No. 116,426 filed Nov. 3, 1987.

The paint layer may be coated on the carrier film having thereon an adhesion promoting tie-layer. Suitable tie-layers can be formed from compositions comprising an adhesion promoting species and optionally a suitable solvent. Useful adhesion promoting species include polymers derived from acrylonitrile, vinylidene chloride, and acrylic acid; polymers derived from methylacrylate, vinylidene chloride and itaconic acid; cellulose nitrate, and a variety of commercially available adhesion promoting species, for example, those known under the trade designations FORMVAR 7/95, FORMVAR 15/95, BUTVAR B-98 and BUTVAR B-72, sold by Monsanto, MOBAY N-50 sold by Mobay, VINAC B-15 sold by Air Products, ELVACITE sold by DuPont, and LEXAN sold by General Electric. Suitable solvents include methyl ethyl ketone, methylene chloride, tetrahydrofuran, toluene, methyl cellosolve, methanol, ethanol, propanol, butanol, mixtures thereof and the like. The adhesion promoting layer preferably has a thickness not greater than about 0.0025 millimeter (0.1 mil).

In certain embodiments of the invention, it is desirable to employ a clear top coating. Suitable clear coats are transparent and can comprise crosslinkable polyols such as polyester polyols, polyurethane polyols and acrylic polyols, and polyisocyanate curing agents. The clear layer composition can be sprayed or extruded through the narrow slot of a precision coating hopper (as in U.S. Pat. No. 2,681,294) onto the metal layer of the sheet material. This latter method advantageously results in improved smoothness and uniformity, compared to top coats applied by conventional spraying techniques. The clear layer is then converted to a dry and tack-free state, for example by drying by conventional drying techniques at temperatures of 25°–100° C. The clear coat can be applied before or after the precracking step. When applied before pre-cracking, the clear coat should be selected from compositions which do not interfere with the pre-cracking step or with the stretching step which converts the appearance of the metal coating to one having a 20-degree gloss less than 100. Clear coats, whether applied before or after precracking, can change the gloss measurements. Consequently, the measurements given herein refer to the metallic coatings without clear coats.

An important functional requirement of the new type of decorative sheet material of this invention is that it be securely attachable to a shaped substrate. In one form, the sheet material is made soft and flowable by application of heat and is then brought into contact with the article to be coated and securely bonded thereto. Such bonding can be effected by known adhesive bonding techniques, using a wide variety of suitable adhesive compositions, including pressure-sensitive and heat activated adhesives, coated on the side of the carrier film opposite to the deposited metal layer.

The adhesive layer preferably comprises a pressure-sensitive adhesive. Preferred adhesives of this type are the acrylic adhesives. Examples of such adhesives include the acrylic copolymers of a higher alkyl acrylate such as 2-ethylhexyl acrylate copolymerized with a polar comonomer such as acrylic acid, acrylamide or maleic anhydride. The adhesive is coated from a solution of water or an organic solvent which can also contain additives such as a tackifier resin. Further examples of useful acrylic pressure-sensitive adhesives are described in Traynor et al. U.S. Pat. No. 4,726,982 issued Feb. 23, 1988. Such adhesive layers are preferably applied to the flexible and stretchable film by a laminar flow coating method as described in Reafler U.S. patent application Ser. No. 116,426 filed Nov. 3, 1987.

The adhesive layer, if present, is coated onto the carrier film of the sheet material after completion of the pre-cracking operation as described hereinabove.

Following application of a pressure-sensitive adhesive layer, a protective release sheet is applied to the adhesive material to permit handling of the sheet material prior to its use. The release sheet is preferably a thin polyester film having a thickness of about 0.04 mm (1.5 mil).

The sheet material can be applied to a three-dimensional substrate by thermoforming with vacuum. The procedure of thermoforming can be substantially as described in the patent to Short et al., U.S. Pat. No. 4,769,100 wherein the film is heated and then drawn by vacuum into bonding contact with the substrate. Other thermoforming techniques include pressing the heated film into contact with the substrate by means of mating pressure-applying surface and the well-known in-mold technique, the latter being described, for example, in European patent application No. 0,255,071 Avery International Corporation, published 5 Oct. 1988. The term thermoforming is used herein to include all of such forming techniques in which a plastic film is heated, stretched and bonded to a substrate.

The following examples further illustrate the invention:

EXAMPLE 1 (INVENTION)

A carrier film is prepared from a blend described in U.S. Pat. No. 4,582,876 as follows. A mixture of 55:45 percent by weight of polyester 1) and Dylark$^R$ Styrene Copolymer 600 is compounded by extrusion. Polyester 1) is derived from terephthalic acid, 19 mole percent ethylene glycol and 81 mole percent 1,4-cyclohexanedimethanol. Dylark$^R$ Styrene Copolymer 600 is a rubber modified styrene-maleic anhydride copolymer available from ARCO Chemical Company, a division of Atlantic Richfield Company. The blend is heated to 200°–290° C. and extruded through a die into a nip comprising two temperature controlled chrome plated stainless steel rollers. The extruded web is then cooled on a chill roller. The thermoplastic carrier film has a mean thickness of about 0.20 millimeters (7.5 mils) and a glass transition temperature (Tg) of 93° C.

Onto one surface of a continuously moving web of the carrier film prepared as described above is applied a layer of titanium at a thickness of about 0.1 μm by the vacuum deposition process described by Maissel and Glang in Sections 1-50 and 1-54 of the Handbook of Thin Film Technology, (1983 Edition) published by McGraw-Hill Book Company, N.Y. The 20-degree gloss of the surface of the metal layer measured by the aforementioned method is in excess of 100.

The so prepared sheet material is pre-cracked biaxially at a temperature of 22° C. by continuously advancing the web under tension sequentially over a first and a second cracking member as shown in FIG. 1, with the surface of the carrier film remote from the metal layer making contact with the cracking members. Each of the angles α and β is 45°.

The continuous web of the cracked metal coated film is then wound on a take-up roll for storage. In a subsequent operation, the web is unwound from the take-up roll and cut into individual sheets. The 20° gloss of the metal surface is measured again and found to be still in excess of 100. One of the sheets is then molded by a vacuum thermoforming process as follows: The sheet is heated by banks of infra-red lamps to about 135° C., then moved to an opening of a chamber containing a three-dimensional substrate and releasably applied by vacuum drawdown. The now three-dimensionally shaped sheet shows a diffuse, non-specular surface having a brushed metal appearance distinctly different from that of the glossy surface of the sheet prior to the thermoforming step. The 20-degree gloss of a portion of the metal surface having been stretched during the thermoforming operation by about 70% is found to be about 60. Stretched portions of the sheet material are translucent.

The surface of the same portion having been stretched by about 70% exhibits a geometric metamerism (flop) of 114 as measured by the method disclosed in U.S. Pat. No. 4,479,718 and calculated by the Alman Equation:

$$\text{Flop} = 15(L_1^* - L_3^*)^{1.11}/L_2^{*0.86}$$

wherein $L_1^*$, $L_2^*$ and $L_3^*$ are lightness values measured at 15°, 45° and 100° intervals away from the specular reflection angle.

The reading is made with a Murakami Goniospectrophotometer at the reflection angles:
$L_1^* = 30°$
$L_2^* = 0°$
$L_3^* = -65°$
using a CIELAB value with D65 illumination and a 10° viewer at the above-defined $L_1^*$, $L_2^*$ and $L_3^*$ reflection angles and a 45° incidence angle.

Figure 7:
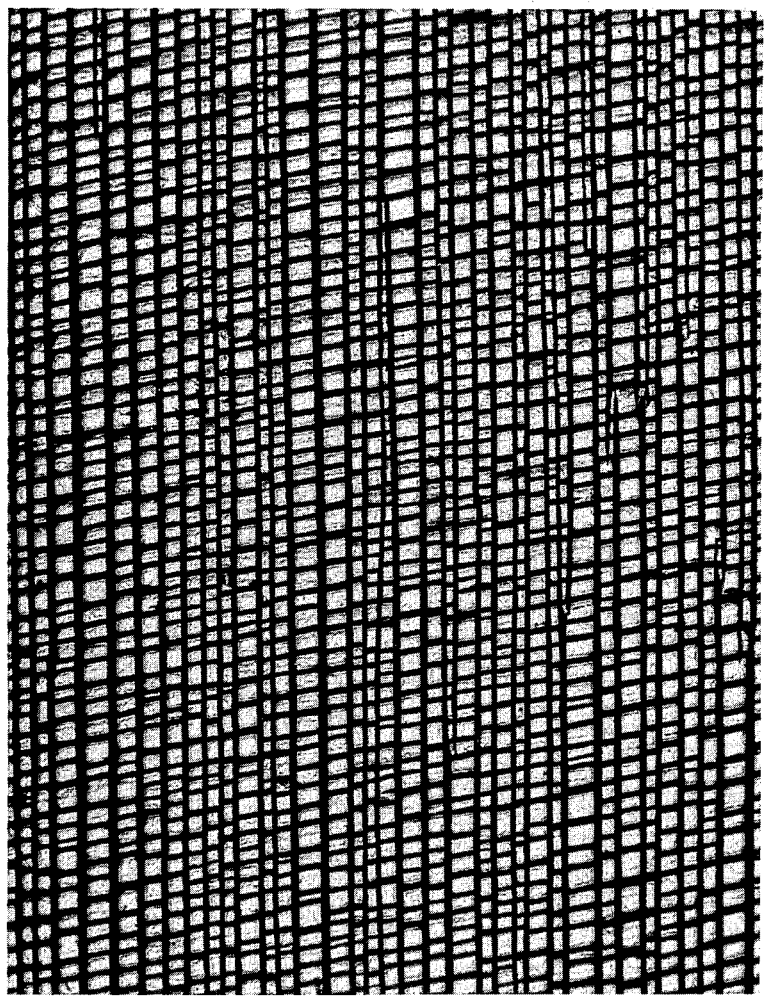
FIG. 7 is a 70-× enlarged photograph of the microscopic crack pattern in the metal layer of a protective and decorative sheet material of the invention after its stretching and thermoforming onto a three-dimensional substrate.

FIG. 7 is a 70-× enlarged photograph showing the approximately quadrangular microscopic crack pattern in the metal layer of the sheet material after it has been stretched and thermoformed as described above.

COMPARISON EXAMPLE

Figure 8:
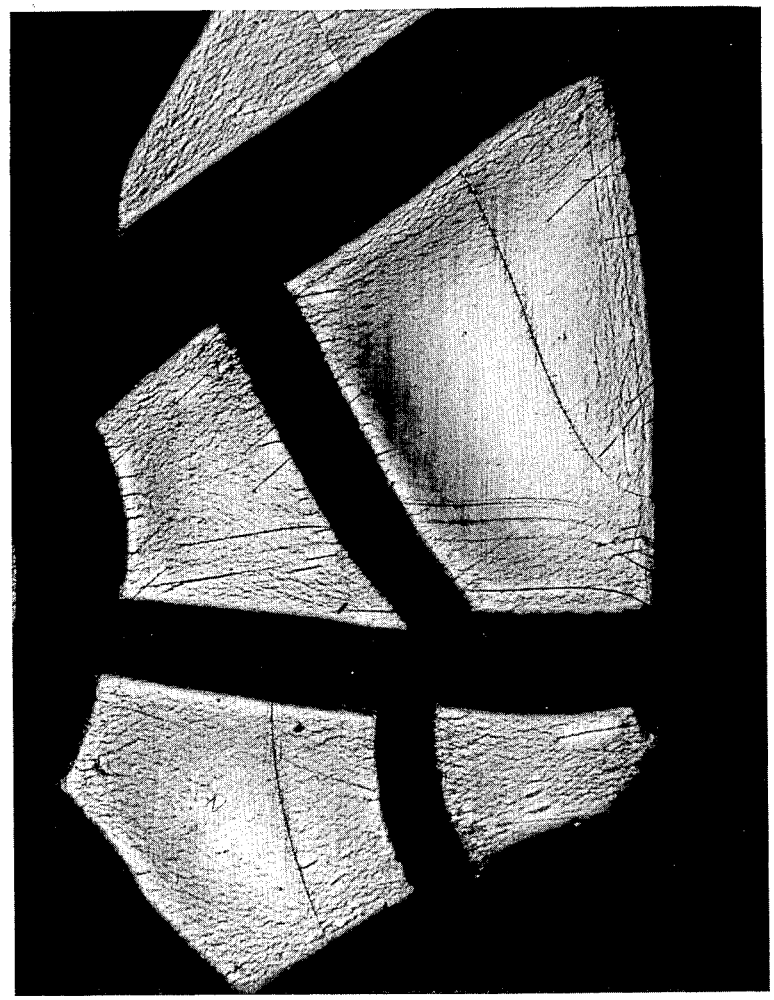
FIG. 8 is a 70-× enlarged photograph of a pattern created in the non-cracked metal layer of a stretched and thermoformed sheet material made by a method outside the scope of this invention.

A repeat of the procedure described in Example 1, but omitting the pre-cracking step, leads to a surface appearance in stretched areas of the thermoformed sheet as illustrated by the 70-× enlarged photograph shown in FIG. 8. The pattern created in the metal layer is highly irregular and the surface does not have an attractive brushed metal appearance as does the thermoformed sheet material of the invention.

The invention has been described in detail with particular reference to preferred embodiments thereof, but it will be understood that variations and modifications can be effected within the spirit and scope of the invention.

I claim:

1. A continuous method for making a protective and decorative sheet material which comprises:
   (A) forming a highly reflective, specular, continuous metal layer on a continuously moving web of a stretchable, thermoformable, polymeric carrier film; and
   (B) cracking the metal layer biaxially at a temperature below the glass transition temperature of the carrier film by continuously bending and drawing the web around a first cracking member having a linear cracking edge to create a first series of substantially linear and parallel microscopic cracks in the metal layer, continuously bending and drawing the web around a second cracking member having a linear cracking edge which is non-parallel to the first cracking member edge to create a second series of substantially linear and parallel microscopic cracks in the metal layer, said first series of cracks being non-parallel to the second series, and thereby forming in the metal layer a substantially regular, microscopic parallelogram crack pattern, the so cracked metal layer
   (a) having a 20-degree gloss of at least 100; and
   (b) being capable, when the sheet material is stretched above the glass transition temperature of the carrier film, of exhibiting a brushed metal appearance having a 20-degree gloss of less than 100.

2. A method as defined in claim 1 which further comprises coating a paint layer on the carrier film before the metal layer is formed.

3. A method as defined in claim 2 which further comprises coating an adhesive layer on the surface of the carrier film opposite the metal layer.

4. A method as defined in claim 1 which further comprises coating a clearcoat over the metal layer.

5. A method as defined in claim 1 wherein the metal is titanium.

* * * * *